United States Patent [19]

Kanamaru

[11] Patent Number: 4,868,679
[45] Date of Patent: Sep. 19, 1989

[54] METHOD OF RECORDING AND REPRODUCING COLOR VIDEO SIGNALS

[75] Inventor: Hitoshi Kanamaru, Tokorozawa, Japan

[73] Assignee: Pioneer Electronic Corporation, Tokyo, Japan

[21] Appl. No.: 143,642

[22] Filed: Jan. 13, 1988

[30] Foreign Application Priority Data

Jan. 14, 1987 [JP] Japan .................................. 62-7860
Feb. 6, 1987 [JP] Japan ................................ 62-26593
Feb. 6, 1987 [JP] Japan ................................ 62-26594

[51] Int. Cl.$^4$ .......................................... H04N 9/80
[52] U.S. Cl. ................................................. 358/334
[58] Field of Search ................ 358/12, 15, 310, 330, 358/334

[56] References Cited

U.S. PATENT DOCUMENTS

| | | | |
|---|---|---|---|
| 2,580,685 | 1/1952 | Mathes | 358/15 |
| 3,700,793 | 10/1972 | Borsuk et al. | 358/15 |
| 4,553,176 | 11/1985 | Mendrala | 358/334 |
| 4,656,527 | 4/1987 | Uchimi | 358/310 |
| 4,710,824 | 12/1987 | Alston | 358/310 |

FOREIGN PATENT DOCUMENTS

| | | | |
|---|---|---|---|
| 57-166794 | 10/1982 | Japan | 358/12 |
| 60-32493 | 2/1985 | Japan | 358/12 |
| 61-70891 | 4/1986 | Japan | 358/12 |

OTHER PUBLICATIONS

Furuya, "Superimposition of Baseband Chrominance Signals on Luminance Signal for Color TV Transmission", *Review of the Electrical Communication Laboratories*, vol. 27, Nos. 3–4, Mar.–Apr. 1979, pp. 265–275.

*Primary Examiner*—Donald McElheny, Jr.
*Attorney, Agent, or Firm*—Fleit, Jacobson, Cohn, Price, Holman & Stern

[57] ABSTRACT

A method for recording broad-band color video signals in which the broad-band 3-color signals are separated into narrow-band 3-color signals and a high-band monochrome signal having a higher frequency band. The high-band monochrome signal is divided into three bands and frequency-converted respectively. The frequency-converted three bands of the high-band monochrome signal are merged into the narrow-band 3-color signals, while maintaining the frequency interlace relationship, so that three composite color video signals are produced. The thus produced three composite color video signals are recorded on different regions of recording medium.

6 Claims, 13 Drawing Sheets

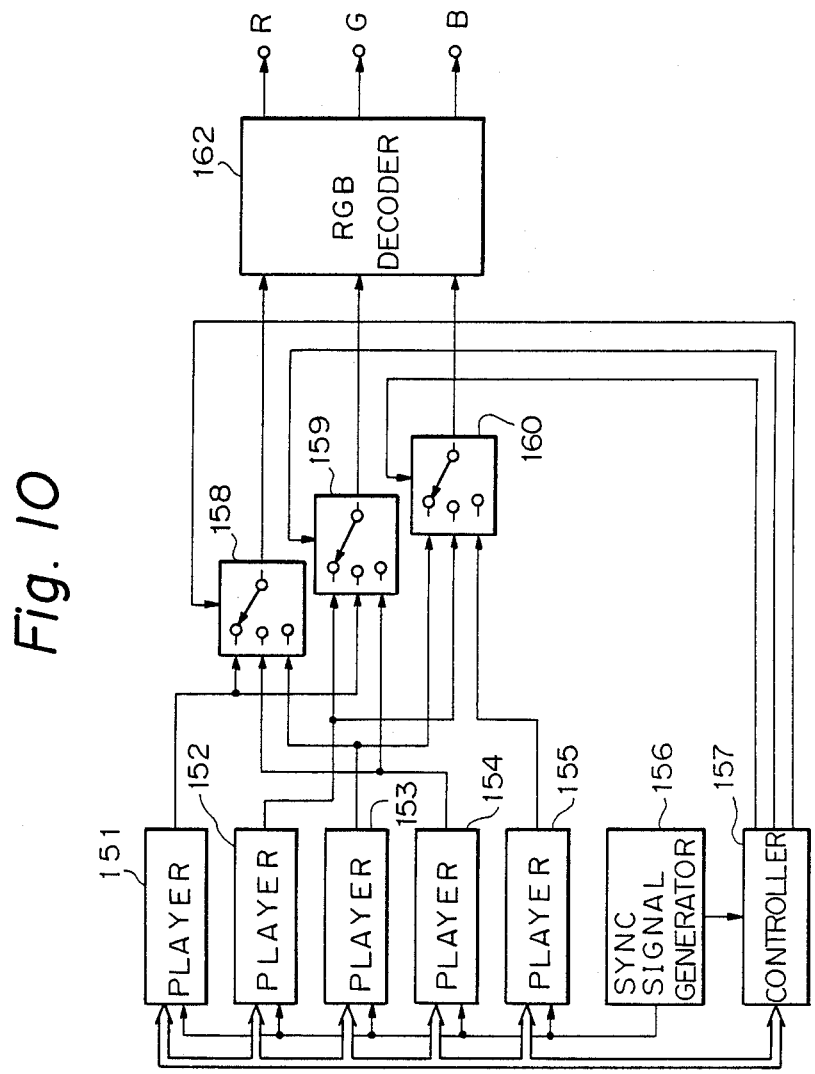

METHOD OF RECORDING AND REPRODUCING COLOR VIDEO SIGNALS

BACKGROUND OF THE INVENTION

1. Field of the Invention

The present invention relates to a method of recording color video signals and particularly to a method of recording broad-band color video signals and a digital audio signal on the basis of superimposition on recording media. The present invention also relates to a method of recording and reproducing broad band color video signals for HDTV (high definition television) broadcasting.

2. Description of Background Information

As a recording medium on which a color video signal and a digital audio signal are recorded, there is commercialized a "Hi-Fi Video Disc" on which are recorded the conventional video disc recording signal and in addition a digital audio signal in a so-called "CD (Compact Disc) format" in the manner of superimposition.

With this Hi-Fi video disc, dynamic range of the digital audio signal can be raised as high as 90 db or more, thereby significantly improving the sound quality as compared with the audio signal recording-playback system based on the frequency modulation method. On the other hand, however, the video band is determined by the width of side band of the FM video signal, and of the video band is made too wide, the reproduced video signal and analog audio signal are adversely affected by the interference between the side band of the FM video signal and the analog audio carrier signal. On this account, it is not possible to set the band of video signal to 4.2 MHz or higher, and therefore the resolution of picture is restricted.

A conceivable breakthrough is to eliminate the FM audio signal components, leaving only the digital audio signal component. This scheme enables recording of a video signal having a band width of 6 MHz, and the picture resolution can be improved.

Even with this recording method, however, it is not possible to record a broad-band color video signal of HDTV broadcasting. Namely, the broad-band color video signals for HDTV broadcasting has a band width five times (20 MHz) the color video signal of the NTSC system. Therefore, it can not be processed even by means of a recording system with a 6 MHz band width. Thus, the broad-band color video signal for HDTV broadcasting can not be recorded on an optical video disc by means of the conventional recording/playback method oriented to video signals with the band width below 6 MHz.

With the intention of recording the broad-band color video signal for HDTV broadcasting on the optical recording disc, a recording method is conceivable in which the recording disc is rotated at a high speed. In this method, however, the disc speed is as high as 6000 rpm, and it is difficult to design a focus servo system for focusing the information reading laser bean on the recording surface of the recording disc and a tracking servo system for positioning the spot of the information reading laser beam formed on the surface of the recording disc. It is also difficult to have a long time continuous playback by the broad-band color video signals.

Another method has been proposed, in which the broad-band color video signal is compressed in band width by the MUSE (Multiple Sub-Nyquist Sampling Encoding) system, and the band-compressed color video signal is recorded and reproduced with the conventional signal write and read units. The MUSE system, however, has a drawback of deterioration of resolution for moving pictures.

OBJECTS AND SUMMARY OF THE INVENTION

The present invention therefore contemplates to alleviate the drawbacks described above, and a prime object of the present invention is to provide a recording system capable of recording broad-band color video signals having a band width of 20 MHz on recording media.

Another object of the present invention is to provide a method of recording and reproducing broad-band color video signals using the conventional signal write and read units without incurring the deterioration of resolution, and in playback operation, reproducing pictures based on the broad-band color video signals continuously over a long period of time.

According to the present invention, the color video signal recording method comprises the steps of separating broad-band 3-color video signals into narrow-band 3-color signals and a high-band monochrome signal having a frequency band higher than the narrow-band signals, dividing the high-band monochrome signal into three bands and, after implementing frequency conversion, merging (convolving) the band-divided, frequency-converted monochrome signals into the narrow-band 3-color signals, while maintaining the frequency interlace relationship, thereby producing three composite color video signals, and recording the three composite color video signals in different regions of recording medium.

According to another aspect of the invention, a method of recording and reproducing a color video signal comprises the steps of separating broad-band 3-color video signals into narrow-band 3-color signals and a high-band monochrome signal having a frequency band higher than the narrow-band signals, dividing the high-band monochrome signal into three bands and, after implementing frequency conversion, merging (convolving) the band-divided, frequency-converted monochrome signals into the narrow-band 3-color signals, while maintaining the frequency interlace relationship, thereby producing three composite color video signals, and recording the three composite color video signals in different regions of a recording medium, and for playback, retrieving recorded information from the three recording regions concurrently in synchronism with a predetermined reference signal, and reproducing the original broad-band 3-color signals from the three composite color video signals.

According to further aspect of the invention, a method of recording and reproducing a color video signal comprises the steps of separating broad-band 3-color video signals into narrow-band 3-color signals and a high-band monochrome signal having a frequency band higher than the narrow-band signals, dividing the high-band monochrome signal into three bands and, after implementing frequency conversion, merging (convolving) the band-divided, frequency-converted monochrome signals into the narrow-band 3-color signals, while maintaining the frequency interlace relationship, thereby producing three composite color video signals, and recording portions of the composite color video signals corresponding to portions of a plurality of picture on one main surface of the first, second and third recording media, and thereafter, recording portions which follow the portions corresponding to the picture portions on the main surface of a fourth recording medium and another main surface of the first and second recording media, and for playback, reading out recorded information from one main surface of the first and second and third recording media, and thereafter, reading out recorded information from one main surface of the fourth recording medium and another main surface of the first and second recording media, and reproducing the original broad-band 3-color signals from the three composite color video signals.

BRIEF DESCRIPTION OF THE DRAWINGS

FIGS. 2 through 6 are diagrams showing the frequency band widths and spectrum arrangements during the converting process performed by the converting circuit shown in FIG. 1, and in which FIG. 2 is a diagram showing the frequency band widths of 3-color signals R, G, B, FIG. 3. is a diagram showing the frequency band widths of narrow band 3-color signals R', G', B' and the remaining higher frequency component M, FIG. 4 is a diagram showing the frequency band widths of signals H1, H2, and H3, FIG. 5 is a diagram showing the frequency band widths of signals H1', H2', and H3', and FIG. 6 is a diagram showing the spectrum arrangement of output signals VR, VG, and VB of adders 26–28;

FIG. 10 is a block diagram of another example of the playback system for reproducing the broad-band color video signal recorded on recording discs on the basis of the recording/reproducing method according to the present invention;

DETAILED DESCRIPTION OF THE PREFERRED EMBODIMENTS

Before entering into the explanation of the preferred embodiments of the present invention, the frequency band width and the recording signal spectrum allocation for recording for recording information on the Hi-Fi video disc will be explained with reference to FIGS. 15 through 18.

Figure 15:
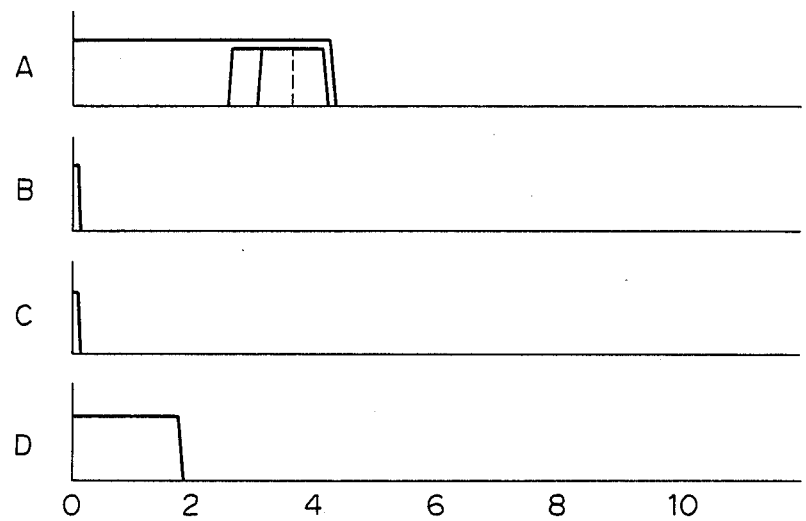
FIGS. 15A–D and 16 are diagrams showing the frequency band widths and recording signal spectrum allocations for recording information on the Hi-Fi video disc.
Figure 16:
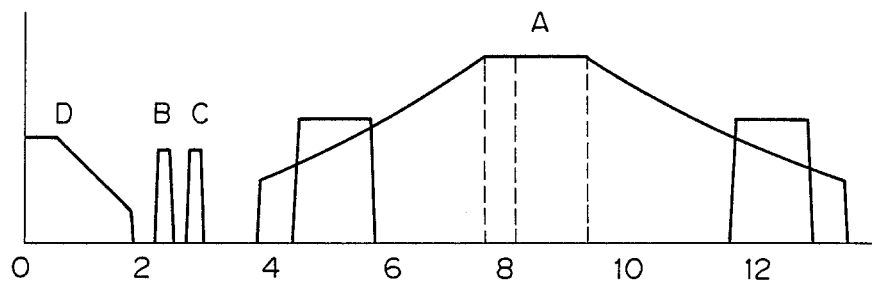

In FIGS. 15 and 16, a portion indicated by A represents an FM video signal component, a portion indicated by B represents an FM analog audio signal component for left-channel, a portion indicated by C represents an FM analog audio signal component for right-channel, and a portion indicated by D represents an EFM (Eight to Fourteen Modulation) signal component for a digital audio signal.

As mentioned before, the band width of the video signal can not be broadened wider than 4.2 MHz, and the picture resolution is restricted.

Figure 17:
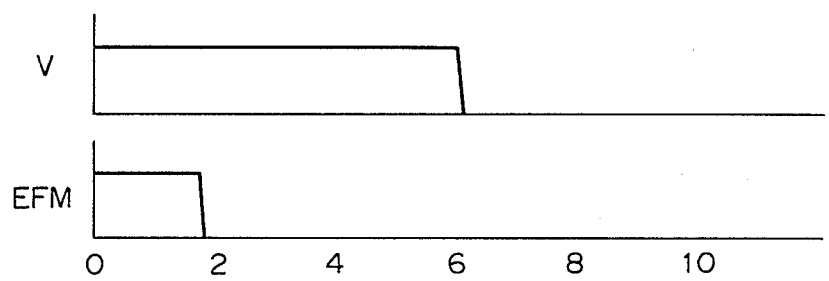
FIGS. 17 and 18 are diagrams showing the frequency band widths and recording signal spectrum allocations for recording information in the case where the FM audio signal is removed from the Hi-Fi video disc.
Figure 18:
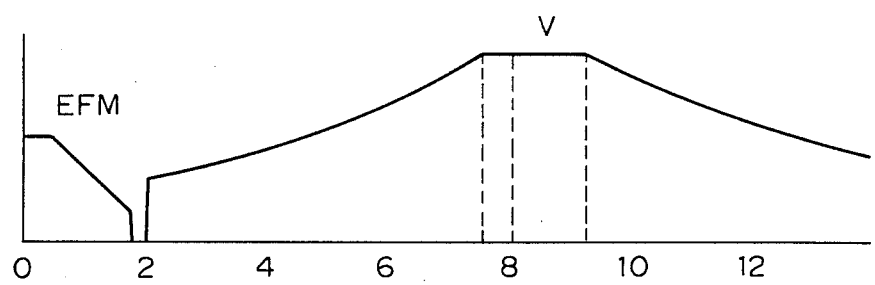

FIGS. 17 and 18 show the signal band widths and the spectrum arrangement in the case in which the FM audio signal components B and C are eliminated, leaving only the EFM audio signal component D. As shown, this scheme enables the recording of a video signal having a band width of 6 MHz, and it is possible to improve the picture resolution. However, as mentioned before, even with this method, it is not possible to record a broad-band color video signal for HDTV broadcasting.

Figure 7:
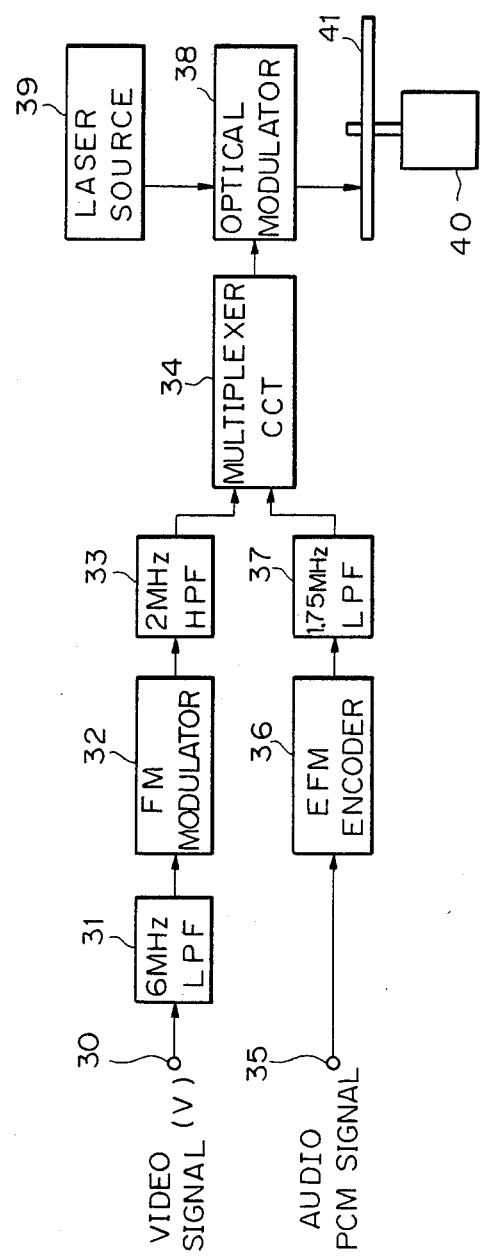
FIG. 7 is a block diagram showing the write system for recording the 6 MHz narrow-band color video signal produced by the system shown in FIG. 1 on a recording disc.

An example of a recording apparatus to which the above mentioned recording method can be applied is illustrated in FIG. 7.

In FIG. 7, a color video signal supplied to a video input terminal 30 is fed to a low-pass filter (LPF) 31 having a cutoff frequency of 6 MHz. An output color video signal of the low-pass filter 31 is frequency-converted by an FM modulator 32, and in turn delivered by way of a high-pass filter (HPF) 33 having a cutoff frequency of 2 MHz to a multiplexer circuit 34. An audio PCM (Pulse Code Modulation) signal supplied to an audio input terminal 35 is converted into an EFM signal by an EFM encoder 36, and in turn delivered by way of an LPF 37 having a cutoff frequency of 1.75 MHz to the multiplexer circuit 34.

Then, the FM video signal and the EFM audio signal are multiplexed by the multiplexer circuit 34, and a resulting multiplexed signal is supplied to an optical modulator 38 in which the multiplexed signal operates to turn on and off a laser beam generated by a laser source 39. Also, the recording apparatus can have such an arrangement that the output multiplexed signal of the multiplexer circuit 34 is supplied to a limiter circuit for implementing a pulse width modulation (PWM) operation, and an output signal of the limiter circuit is supplied to the optical modulator 38. The laser beam modulated in this way is irradiated on a master disc 41 which is rotated by a motor 40, thereby recording the video and audio signals.

The recording method according to the present invention is characterized by recording a 20 MHz broad-band color video signal, after dividing, on three master discs for example, using three sets of the recording apparatus shown in FIG. 7 or using one set of the recording apparatus three times.

Figure 1:
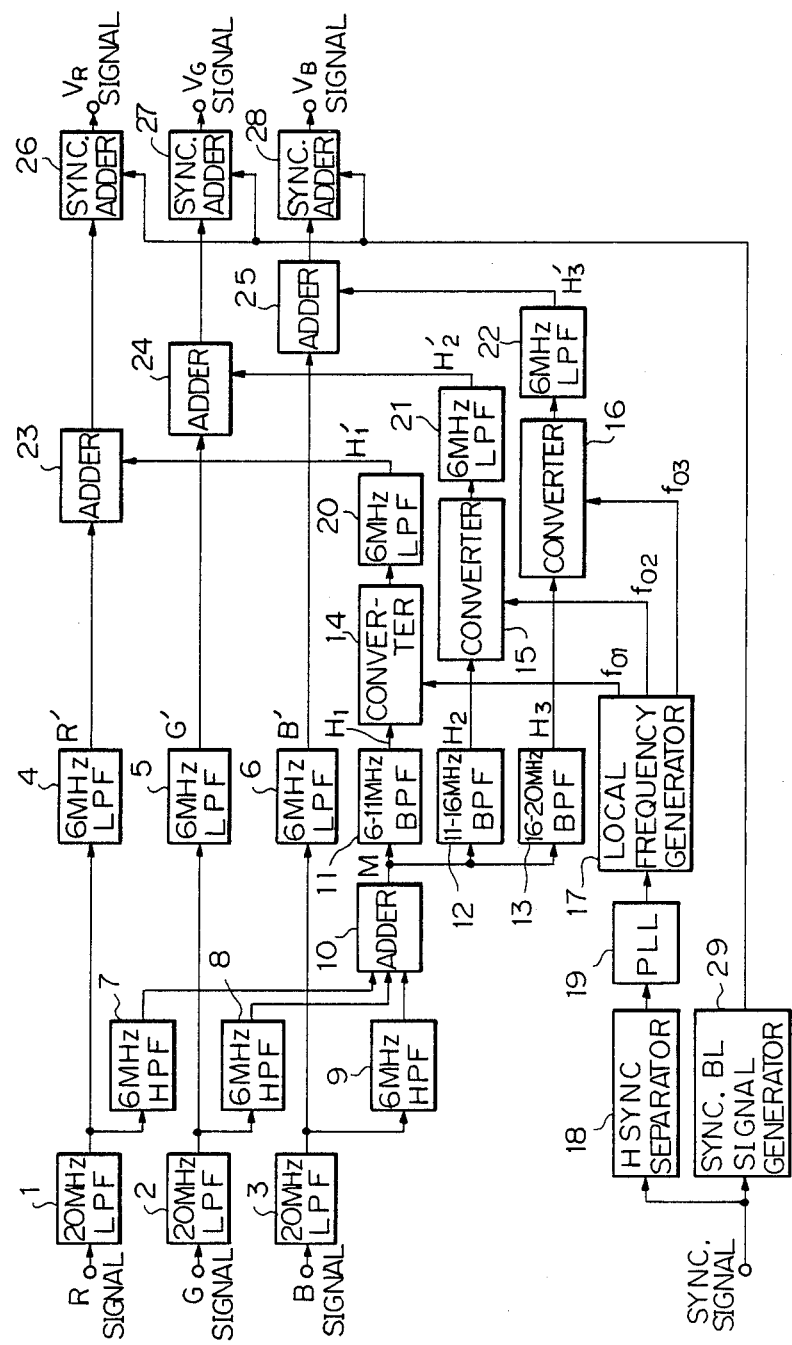
FIG. 1 is a block diagram showing an example of the circuit arrangement of a system for converting broad-band color video signals into 6 MHz narrow-band color video signals on the basis of the recording method according to the present invention.

FIG. 1 is a block diagram showing an example of a circuit arrangement for converting a broad-band color video signal into narrow-band color video signals of 6 MHz that can be recorded with the recording apparatus shown in FIG. 7. FIGS. 2 through 6 show the frequency band widths and spectrum allocations in the conversion process of this video signal converting circuit shown in FIG. 1.

Figure 2:
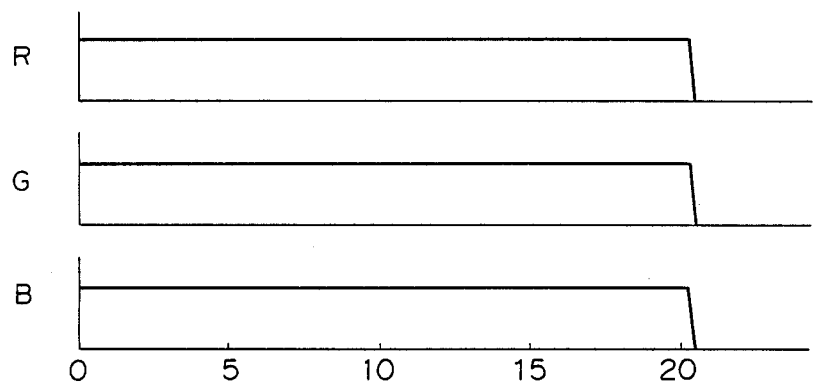
Figure 3:
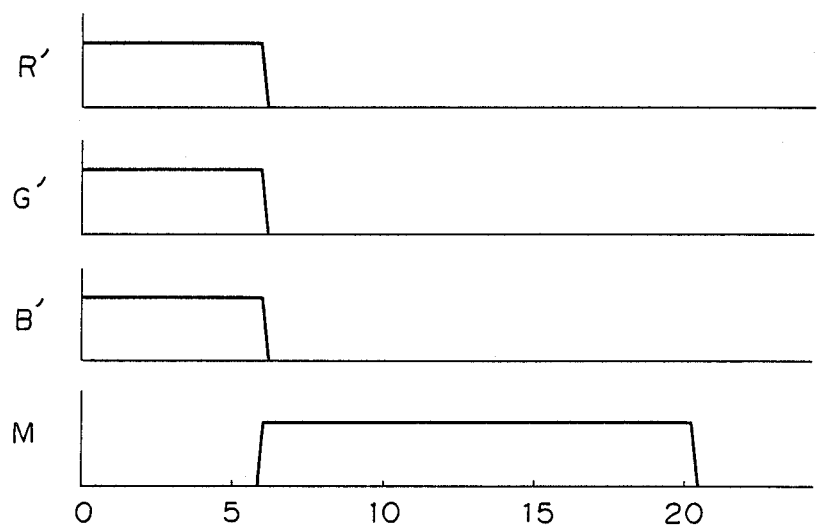

Since a band width of 6 MHz is sufficient for broad-band color video information, 3-color signals R, G, B supplied through LPFs 1, 2, 3 having a cutoff frequency of 20 MHz, whose band widths are shown in FIG. 2 are separated into three narrow-band 3-color signals R', G', B' and remaining higher frequency components by means of LPFs 4 through 6 having a cutoff frequency of 6 MHz and HPFs 7 through 9 having the same cutoff frequency. The components having the frequency higher than 6 MHz passed through the HPFs 7 through 9 are added to form a monochrome high-band signal M by an adder 10. The frequency band widths of the narrow-band 3-color signals R', G', B' and the monochrome high-band signal M are as illustrated in FIG. 3.

Figure 4:
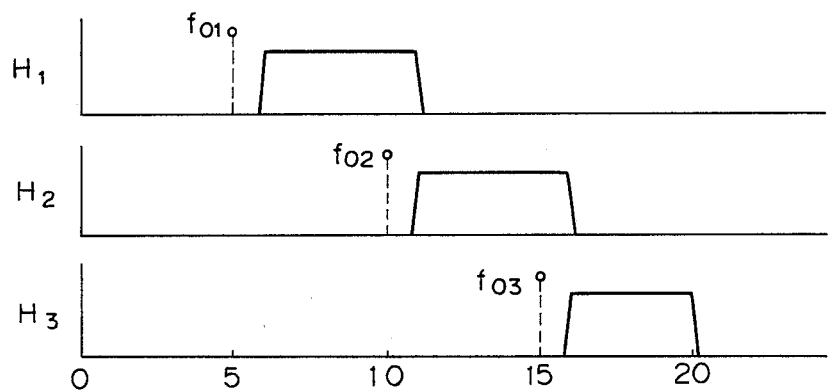
Figure 5:
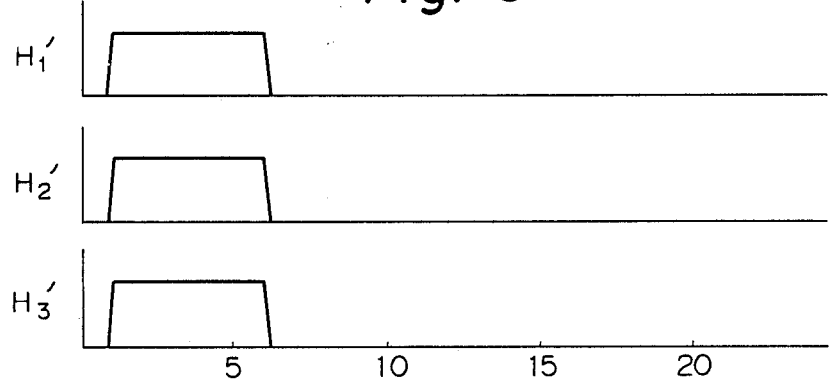

Subsequently, the monochrome high-band signal M is divided into three signals H1 through H3 having a band width of about 5 MHz, as shown in FIG. 4, by means of band-pass filters (BPFs) 11 through 13. These signals H1 through H3 are then frequency-converted into signals H1' through H3' having a band width below 6 MHz, as shown in FIG. 5 by means of corresponding converters 14 through 16 using three different local frequencies $f_{01}$ through $f_{03}$ provided by a local frequency generator 17. The local frequencies $f_{01}$ through $f_{03}$ are respectively set so as to satisfy the following equation:

$$f_0 = (2n+1) \cdot (fH/2)$$

where fH is a horizontal sync frequency, and n is a positive integer. The above frequency conversion is intended to place the monochrome high-band signals at vacant spectrum spaces i.e. odd multiples of fH/2, such spectrum spaces are left unused by the original RGB signals having the spectrum concentrating at multiples of the horizontal sync signal fH. On this account, the local frequency generator 17 is controlled by a PLL circuit 19 which operates in synchronism with the horizontal sync (H sync) signal separated by a horizontal sync separator 18.

Figure 6:
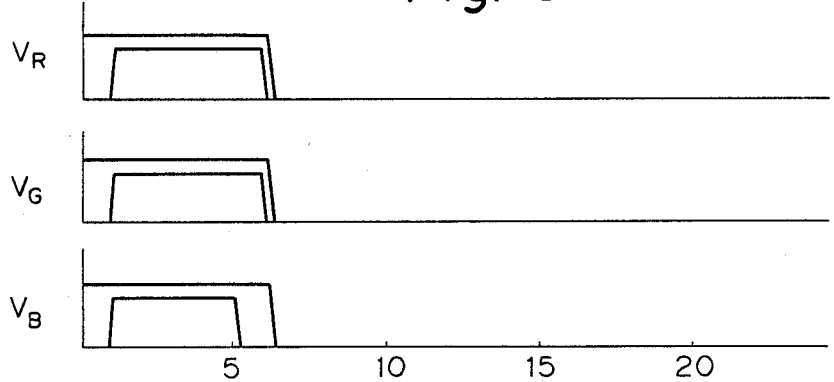

The frequency-converted monochrome high-band signals H1' through H3' are fed through LPFs 20 thorough 22 having a cutoff frequency of 6 MHz to adders 23 through 25, at which the monochrome high-band signals H1' through H3' are combined with the three narrow-band 3-color signals R', G' and B'. Thus, the frequency spectra are integrated (convolved) as shown in FIG. 6. The resultant three signals are supplied to synchronous adders 26 through 28 at which sync signals and blanking signals supplied from a sync and blanking (BL) signal generator 29 are respectively added to the above three signals. Finally the complete signals are set to the video input terminal 30 of the recording apparatus shown in FIG. 7. Consequently, the narrow-band 3-color signals combined with the high-band monochrome signal are respectively processed by a frequency division multiplexing operation together with the EFM signal which occupies the frequency band below 1.75 MHz, and recorded on master discs.

The conversion circuit arranged as described above operates to convert the broad-band 3-color signals into the narrow-band color video signals of 6 MHz, and these signals combined with the three divisions of the high-band monochrome signal divided by 5 MHz with the frequency interlace relation being maintained, are recorded on three master discs by using three sets of the recording apparatuses having the video input terminal 30, or by using the single recording apparatus three times.

As regards the playback of the three recorded discs, three playback units are used to implement external synchronous reproduction, and the reproduced video signals from the playback units are separated, inversely converted and merged so that the original 20 MHz broad-band 3-color signals are restored and displayed on a monitor screen.

Figure 8:
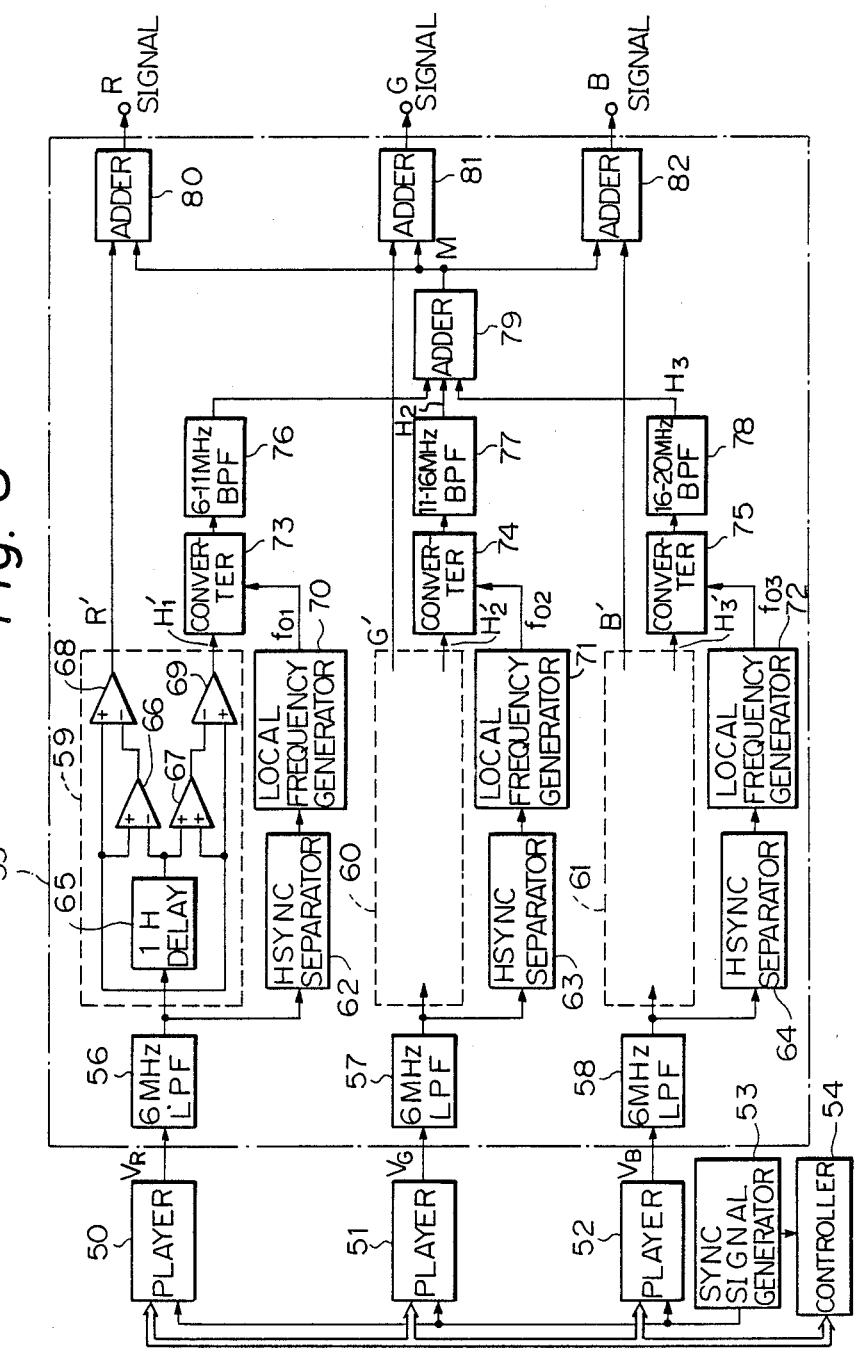
FIG. 8 is a block diagram showing a playback system for reproducing the broad-band color video signal recorded on recording discs on the basis of the recording-/reproducing method according to the present invention.

FIG. 8 shows the playback system used for reproducing the recorded information on the three discs. In the figure, indicated by 50, 51 and 52 are players for reading the 6 MHz narrow-band color signals VR, VG and VB recorded on the three discs. The players 50 through 52 are designed to commence reading from a frame indicated by data issued by a controller 54 in synchronism with a reference synchronizing signal provided by a synchronizing signal generator 53.

The narrow-band color video signals VR, VG and VB released from the players 50 through 52 ae fed to an RGB decoder 55. In the RGB decoder 55, the narrow-band color video signals VR, VG, and VB are fed through LPFs 56–58 with a 6 MHz cutoff frequency and supplied to comb filters 59–61 and also to sync separators 62 through 64.

In the comb filter 59, the narrow-band color video signal VR is delayed by one horizontal period (1H) by means of a 1H delay line 65. The 1H delay line 65 provides its output to a subtractor 66, by which the output component of the 1H delay line 65 is subtracted from the narrow-band color video signal VR. At the same time, the output of the 1H delay line 65 is supplied to the adder 67, and it is added to the narrow-band color video signal VR. The subtractor 66 provides its output signal to another subtractor 68 so that the output 0 component of the subtractor 66 is subtracted from the narrow-band color video signal VR, and consequently the narrow-band color signal R' is separated. The adder 67 provides its output to a subtractor 69 so that the output component of the adder 67 is subtracted from the narrow-band color video signal VR, and consequently the high-band monochrome signal H1' which has been frequency-converted to the signal having a band width below 6 MHz is separated.

The comb filters 60 and 61 are constructed identically to the comb filter 59. The comb filter 60 separated the narrow-band color signal G' and the high-band monochrome signal H2' which has been frequency-converted to the signal below 6 MHz, and similarly the comb filter 61 separates the narrow-band color signal B' and the high-band monochrome signal H3' which has been frequency-converted to the signal below 6 MHz.

The sync separators 62 through 64 separate the horizontal sync signals from the narrow-band color video. signals VR, VG and VB, and they are supplied to local frequency generators 70 through 72. The local frequency generators 70 through 72 are phase locked loop circuits, for example, generating three local signals at frequencies $f_{01}$, $f_{02}$ and $f_{03}$ in synchronism with the horizontal sync signal. The local signals produced by the local frequency generators 70 through 72 are supplied to converters 73 through 75.

The converter 73 implements frequency conversion based on the local signal of $f_{01}$ for the signal H1' released from the comb filter 59, and the high-band monochrome signal H1 is formed. Similarly, the converter 74 converts the signal H2' from the comb filter 60 on the basis of the local signal $f_{02}$ so as to form the high-band monochrome signal H2. The converter 75 converts the signal H3' from the comb filter 61 on the basis of the local signal $f_{03}$ so as to form the high-band monochrome signal H3.

The converters 73 through 75 provide their output signal to BPFs 76, 77 and 78, respectively, by which the high-band monochrome signals H1 through H3 are extracted separately. The high-band monochrome signals H1 through H3 are merged by means of an adder 79, and a high-band monochrome signal M is formed. The high-band monochrome signal M is supplied to adders 80 through 82 so that they are merged into each of the narrow-band color signals R', G' and B'. The the adders 80 through 82 yield the original color signals R, G and B.

Figure 9:
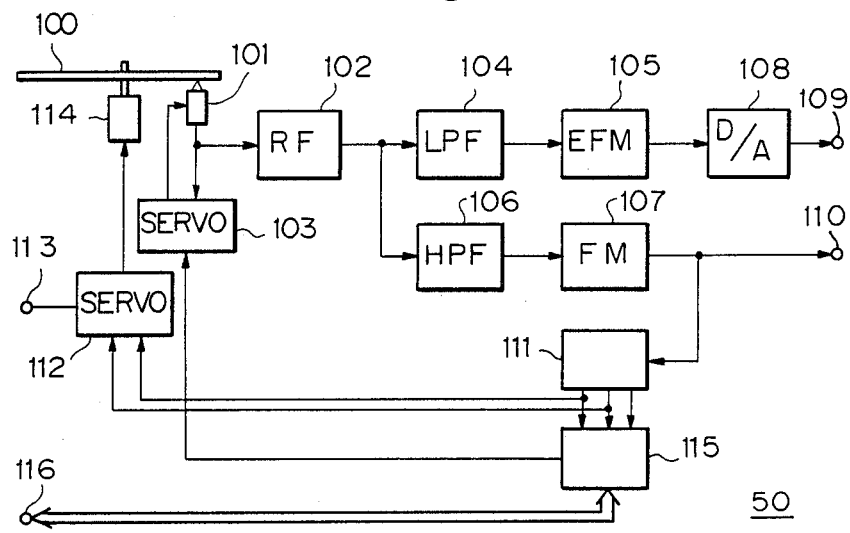
FIG. 9 is a block diagram showing the construction of the players in the playback system shown in FIG. 8.

FIG. 9 shows a specific circuit arrangement of the player 50. In the figure, a disc on which the narrow-band color video signal VR has been recorded read out with an optical pickup 101. The pickup 101 incorporates therein a laser diode, an objective lens, a focusing actuator, a tracking actuator and a photo detector, and so on. The photo detector in the pickup 101 provides its output signal to an RF amplifier 102 and to a servo circuit 103.

The servo circuit 103 includes a focusing servo circuit and a tracking servo circuit, and they drive the focusing actuator and tracking actuator in response to the output signal of the photo detector in the pickup 101. The servo circuit 103 operates such that a laser beam emitted by the laser diode in the pickup 101 is focused to form an information detecting spot on the recording surface of the disc 100, and at the same time, the position of the laser spot in the radial direction of the disc is controlled so that it is located on a track formed on the disc 101.

The RF amplifier 102 delivers its RF (high frequency) output signal by way of an LPF 104 having a cutoff frequency of 1.75 MHz to an EFM decoder 105 and also by way of an HPF having a cutoff frequency of 2 MHz to an FM demodulator 107. Accordingly, the EFM decoder 105 is supplied with the EFM signal which has been separated from the RF signal by the LPF 104. The EFM decoder 105 demodulates the EFM signal to yield an audio PCM signal. The PCM signal is converted into an analog audio signal by a D/A converter 108, and it is delivered to the audio output terminal 109.

The FM demodulator 107 demodulates the RF signal to restore the narrow-band color video signal VR. The signal VR is delivered to the video output terminal 110 and also supplied to a separator 111. The separator 111 is designed to separate the horizontal and vertical sync signals and control data such as Philips code from the narrow-band color video signal VR. The horizontal and vertical sync signals are supplied to a servo circuit 112. The servo circuit 112 produces a motor drive current on the basis of the phase difference between the horizontal and vertical sync signals and the reference sync signal supplied from outside through the sync input terminal 113. Thus, a spindle motor 114 is driven and the rotational speed of the disc 100 is controlled.

The horizontal and vertical sync signals and control data provided by the separator 11 are imparted to a controller 115. The controller 115 also receives various external command signals such as PLAY and PAUSE and also data indicating the disc read starting position. The controller 115 is designed to control the servo circuit 103 in response to command and data, and also deliver the data of a frame under reading to the data input/output terminal 116.

The player 50 described above is known reading device, and it yield the narrow-band color video signal VR of the frame indicated by the data provided by the controller 54 and in synchronism with the reference sync signal provided by the sync signal generator 53. Players 51 and 52 are constructed identically to the player 50, and they yield the narrow-band color video signals VG and VB of the frame indicated by the data from the controller 53 and in the synchronism with the reference sync signal from the sync signal generator 53.

The next embodiment of the present invention will be explained hereinafter.

As described, the conversion system of FIG. 1 is used to convert the broad-band 3-color signals into the narrow-row-band color video signals of 6 MHz and applied to the video input terminal 30 of the recording unit shown in FIG. 7, and by using ten sets of the recording system or using the single unit ten times, the 6 MHz narrow-band RGB signals, with the 5 MHz interval 3-division high-band monochrome signals being merged (convolved) in the frequency interlace relationship, are recorded on five discs. Of these five discs which will be referred to as D1 through D5, the narrow-band color video signal VR is recorded on side 1, of the disc D1 and disc D4 and side 2 of disc D3 sequentially. The narrow-band color video signal VG is recorded on side 1 of the disc D2, and side 2 of the disc D1 and disc D4 sequentially. The narrow-band color video signal VB is recorded on side 1 of the disc D3, side 2 of the disc D2 and side 1 of the disc D5 sequentially.

During the above operation, the sync/blanking signal generator 29 in the conversion unit of FIG. 1 continuously provides control data to detect the quantity of information recorded on discs, and when information for 59 minutes in quantity, for example, has been recorded on side 1 of the disc D1 used for recording the narrow-band color video signal VR, writing onto side 1 of the disc D1 is terminated, when information for 59 minutes and 30 seconds in quantity, for example, has been recorded on side 1 of the disc D2 used for recording the narrow-band color video signal VG, writing to side 1 of the disc D2 is terminated, and when information for 60 minutes in quantity, for example, has been recorded on side 1 of the disc D3 used for recording the narrow-band color video signal VB, writing to side 1 of the disc D3 is terminated, whereby the discs D3 through D3 have their recording termination positions on side 1 differentiated from each other by the distance equivalent to 30 seconds.

FIG. 10 shows the playback system for reproducing information recorded on the five discs. In the figure, indicated by 151 through 155 are players which reads out recorded information on both sides of the discs D1 through D5. The players 151 through 155 are designed to commence reading at a frame indicated by data sent from a controller 157 and in synchronism with the reference sync signal provided by a sync signal generator 156.

The player 151 provides its output signal to selector switches 158 and 159. Similarly, the players 152 and 153 provides their outputs to selector switches 159 and 160 and to selector switches 158 and 160, respectively. The player 54 provides its output to the selector switches 158 and 159, and the player 155 provides its output signal to the selector switch 160.

The selector switch 158 is designed to transmits selectivity one of the output signals from the players 151, 154 and 153 in accordance with the control data. The selector switch 159 operates to select one of the output signals from the players 152, 151 and 154 in accordance with the control data, The selector switch 160 operates to select one of the output signals from the players 153, 152 and 155 in accordance with the control data. These selector switches 158 through 160 are delivered to an RGB decoder 162. The RGB decoder 162 is designed to form the original RGB signals from the narrow-band color video signals VR, VG and VB, as will be described later.

The controller 157 comprises a microcomputer for example. The following describes with reference to the flowcharts of Fogs. 11A and 11B the operation of the processor in microcomputer which performs the control operations in accordance with the program which has been stored in advance in the associated ROM device.

When the START command is issued through the key operation on an operation part (not shown), the processor begins at a step S1, and command the players 151 through 155 to have PAUSE operation at the recording start portion for the specified frame. Subsequently, the processor proceeds to a step S2 and issues the switch control data so that the selector switches 158 through 160 provide the outputs of the players 151 through 153 selectively. In the subsequent step S3, the processor detects as to whether the players 151 through 153 are in the PAUSE state by means of data from the players 151 through 153 indicative of the frame in read. If the players 151 through 153 are fount not in the PAUSE state in the step S3, the processor executes the operation of the step S3 repeatedly and proceeds to a step S4 when the players 151 through 153 are found to be in the PAUSE state. In the step S4, the processor issues a PAUSE CANCEL command to the players 151 through 153.

The processor proceeds to a step S5 to detect as to whether reading of information on the side 1 of the disc D1 has completed by means of the output of data from the player 151 indicative of the last frame on the side 1 of the disc D1. If the step S5 reveals that the reading of information on the side 1 of the dsc D1 has not yet completed, the processor executes the operation of the step S5 repeatedly and proceeds to a step S6 when the completion of the reading of information on the side 1 of the disc D1 is detected. In the step S6, the processor detects as to whether the reference vertical sync signal from the sync signal generator 156 is present. If the reference vertical sync signal is found absent in the step S6, the processor executes the operation of the step S6 repeatedly, and proceeds to a step S7 when the presence of the reference vertical sync signal is detected. In the step S7, the processor issues the PAUSE CANCEL command to the player 154. The processor proceeds to a step S8 and issues the switch control data so that the selector switch 158 provides the output the player 154.

The processor proceeds to a step S9 and command the player 151 to have the PAUSE operation at the recording start position of the side 2 of the disc D1.

The processor proceeds to a step S10 to detect as to whether the reading of information on the side 1 of the disc D2 has completed by means of the output data from the player 152 indicative of the last frame of the side 1 of the disc D2. If the step reveals that the reading of information on the side 1 of the disc D2 has not yet completed, the processor executes the operation of the step S10 repeatedly, and proceeds to a step S11 when the completion of the reading of information on the side 1 of the disc D2 is detected. In the step 11, the processor detects as to whether the reference vertical sync signal from the sync signal generator 156 is present. If the reference vertical sync signal is found absent in the step S11, the processor executes the operation of the step S11 repeatedly, and proceeds to a step S12 when the presence of the reference vertical sync signal is detected. In the step S12, the processor issues the PAUSE CANCEL command to the player 151. The processor proceeds to a step S13 and issues the switch control data so that the selector switch 159 provides the output signal of the player 151. The processor proceeds to a step S14 and command the player 152 to have the PAUSE operation at the recording start position on the side 2 of the disc D2.

The processor proceeds to a step S15 to detect as to whether the reading of information on the side 1 of the disc D3 has completed on the basis of the output of data from the player 153 indicative of the laser frame on the side 1 of the disc D3. If the step S15 reveals that the reading of information on the side 1 of the disc D3 has not yet completed, the processor executes the operation of the step S15 repeatedly, and proceeds to a step S16 when the completion of the reading of information on the side 1 of the disc D3 is detected. In the step S16, the processor detects as to whether the reference vertical sync signal from the sync signal generator 156 is present. If the reference vertical sync signal is found absent in the step S16, the processor executes the operation of the step S16 repeatedly, and proceed to a step S17 when the presence of the reference vertical sync signal is detected. In the step S17, the processor issues the PAUSE CANCEL command to the player 152. The processor proceeds to a step S18 and issues the switch control data so that the selector switch 160 provides the output signal of the player 152. The processor proceeds to the step S19 and command the player 153 to have the PAUSE operation at the recording start position on the side 2 of the disc D3.

The processor proceeds to a step S20 to detect as to whether the reading of information on the side 1 of the disc 4 has completed on the basis of the output of data from the player 154 indicative of the last frame of the side 1 of the disc D4. If the step S20 reveals that information reading on the side 1 of the disc D4 has not yet completed, the processor executes the operation of the step S20 repeatedly, and proceeds to a step S21 when the completion of the reading of information on the side 1 of the disc D4 is detected. In the step S21, the processor detects as to whether the reference vertical sync signal from the sync signal generator 156 is present. If the reference vertical sync signal is found absent in the step S21, the processor executes the operation of the step S21 repeatedly, and proceeds to a step S22 when the presence of the reference vertical sync signal detected. In the step S22, the processor issues the PAUSE CANCEL command to the player 153. The processor proceeds to a step S23 and issues the switch control data so that the selector switch 158 provides the output signal of the player 153. The processor proceeds to a step S24 and command the player 154 to have the PAUSE operation at the recording start position on the side 2 of the disc D4.

The processor proceeds to a step S25 to detect as to whether the reading of the information on the side 2 of the disc D1 has completed on the basis of the output of data from the player 151 indicative of the last frame of the side 2 of the disc D1. If the step S25 reveals that the reading of information on the side 2 of the disc D1 has not yet completed, the processor executes the operation of the step S25 repeatedly, and proceeds to a step S26 when the termination of the reading of information on the side 2 of the disc D1 is detected. In the step 26, the processor detects as to whether the reference vertical sync signal from the sync signal generator 156 is present. If the reference vertical sync signal is found absent in the step S26, the processor executes the operation of the step S26 repeatedly, and proceeds to a step S27 when the presence of the reference vertical sync signal is detected. In the step S27, the processor issues the PAUSE CANCEL command to the player 154, the processor proceeds to a step S28 and issues the switch control data so that the selector switch 159 provides the output of the player 154.

The processor proceeds to a step S29 to detect as to whether the reading of information on the side 22 of the disc D2 has completed on the basis of the output of data from the player 152 indicative of the last frame of the side 2 of the disc D2. If the step S29 reveals that the reading of information on the side 2 of the disc D2 has not yet completed, the processor executes the operation of the step 29 repeatedly, and proceeds to a step S30 when the completion of the reading of information on the side 2 of the disc D2 is detected. In the step S30, the processor detects as to whether the reference vertical sync signal from the sync signal generator 156 is present. If the reference vertical sync signal is found absent in the step S30, the processor executes the operation of the step S30 repeatedly, and proceeds to a step S31 when the presence of the reference vertical sync signal is detected. In the step S31, the processor issues the PAUSE CANCEL command to the player 155. The processor proceeds to a step S32 and issues the switch control data so that the selector switch 160 provides the output signal of the player 155, and returns to the routine which had been executed before the processor has proceeded to the step S1.

Figure 12:
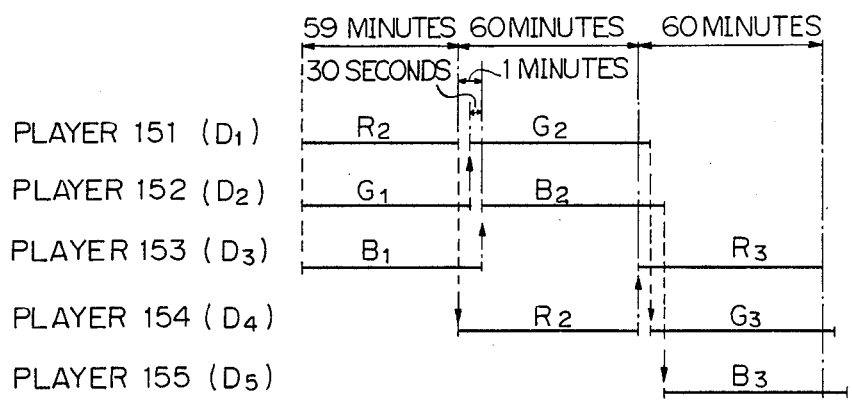
FIG. 12 is a timing chart showing the operation of the system shown in FIG. 10.
Figure 11A:
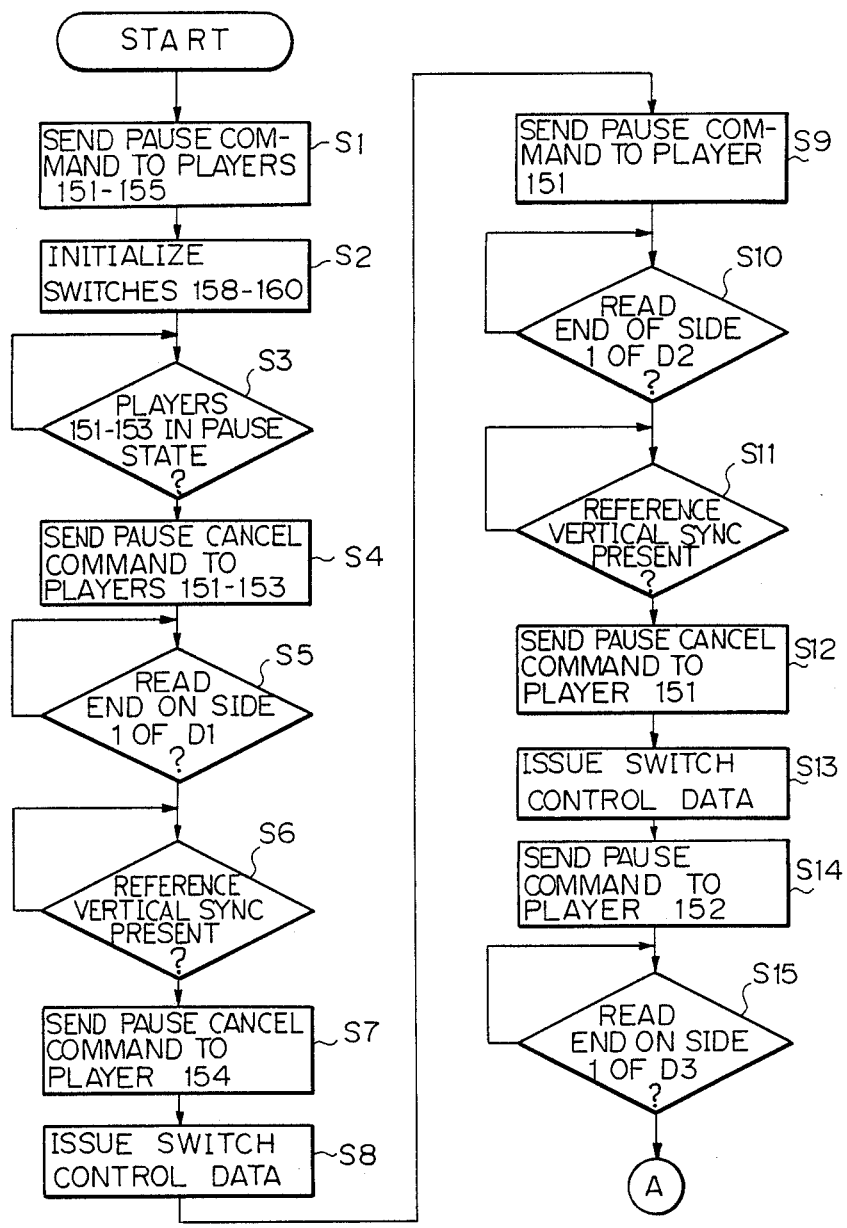
FIGS. 11A and 11B are flow charts showing the operation of the processor in the controller 57 in the system shown in FIG. 10.
Figure 11B:
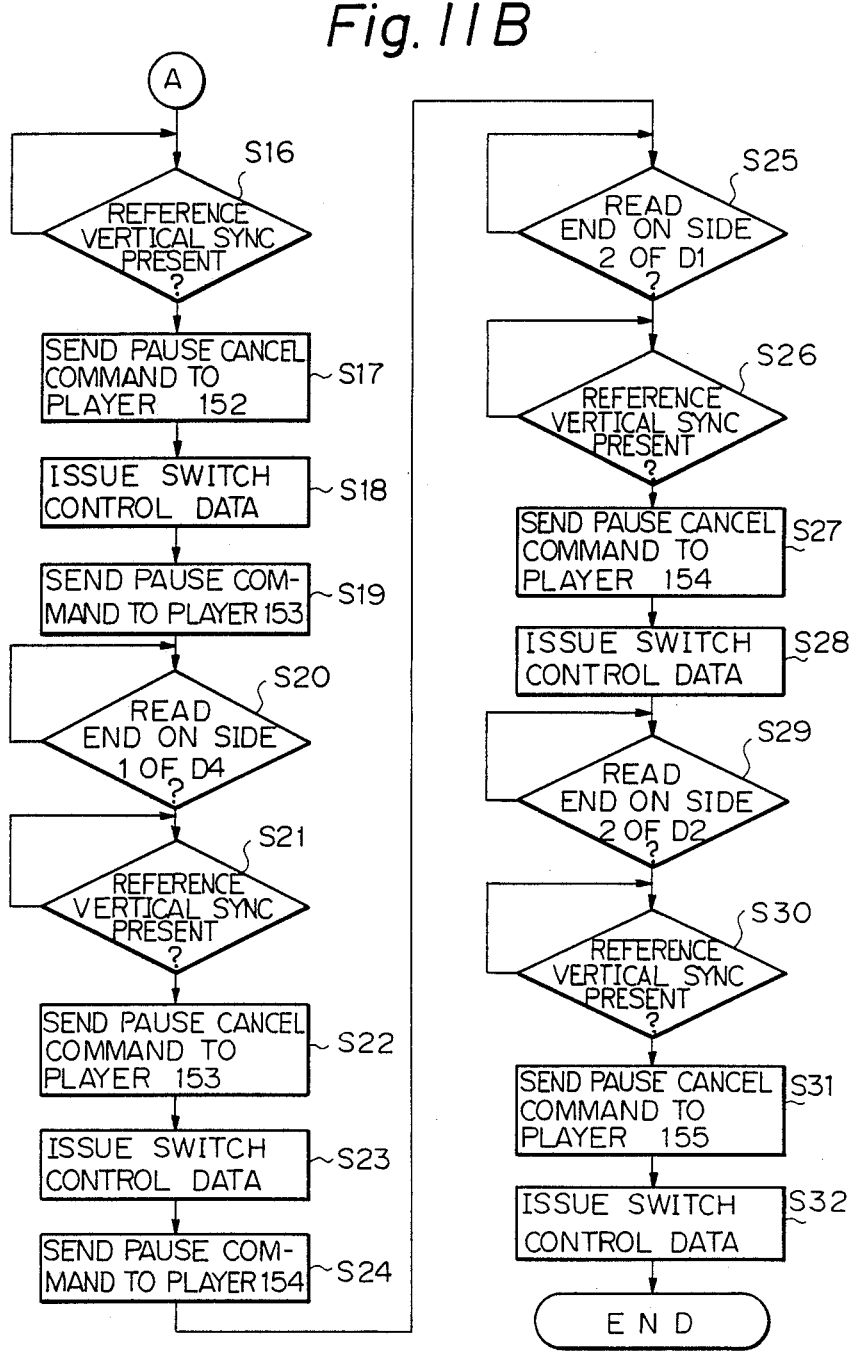

Through the foregoing operations, information recorded on the discs D1 through D5 mounted on the players 151 through 155 is taken as shown in FIG. 12. Even though switching of read-out recording surface takes time for the players 151 through 155, the narrow-band color video signals VR, VG and VB from the selector switches 158 through 160 are obtained continuously over a 179 minutes period. Consequently, the RGB decoder 162 output the original RGB signals continuously for 179 minutes, and playback pictures based on the broad-band color video signals is presented continuously over a period of 179 minutes.

Figure 13:
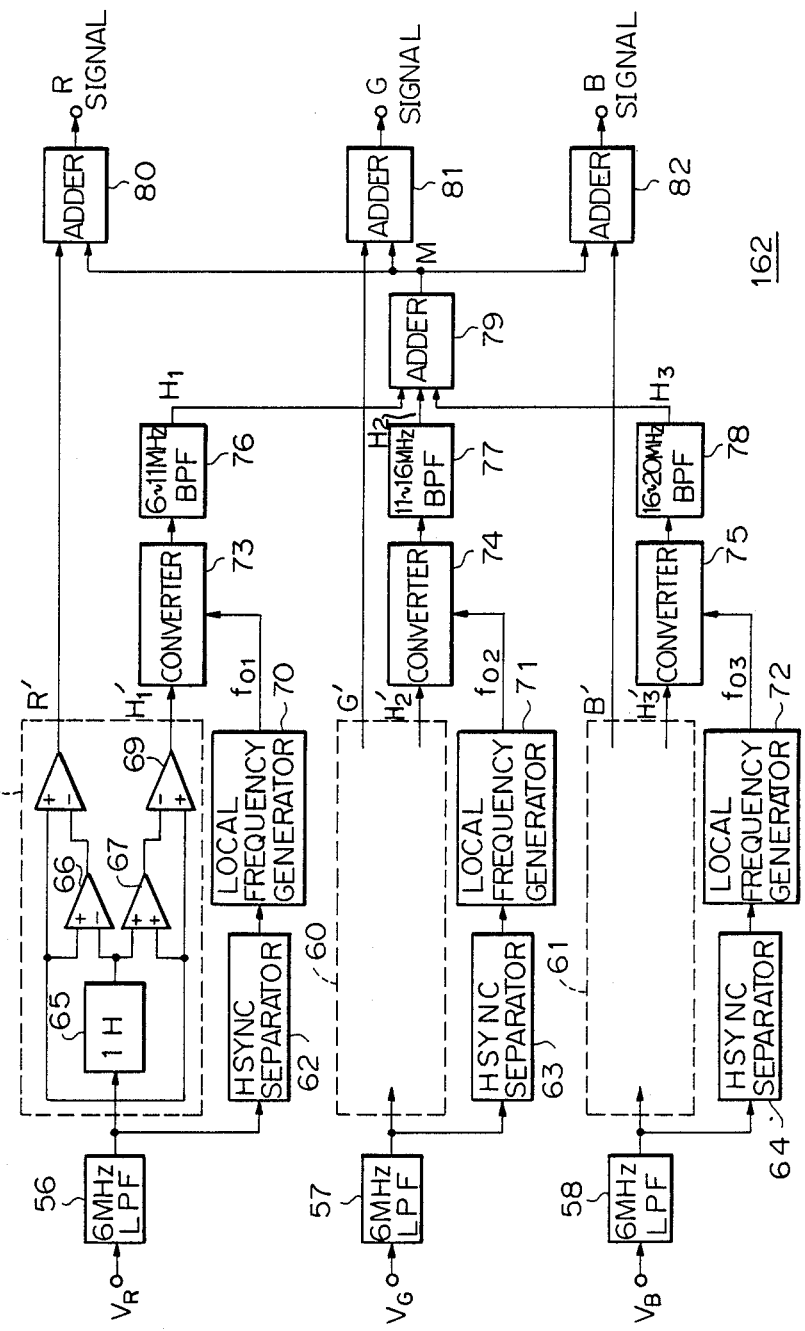
FIG. 13 is a block diagram showing the construction of the RGB decoder in the system shown in FIG. 10.

FIG. 13 shows in block the construction of the RGB decoder 162. Since this RGB decoder 162 has the construction identical to that of the RGB decoder 55 shown in FIG. 8, the explanation thereof will not be repeated.

Figure 14:
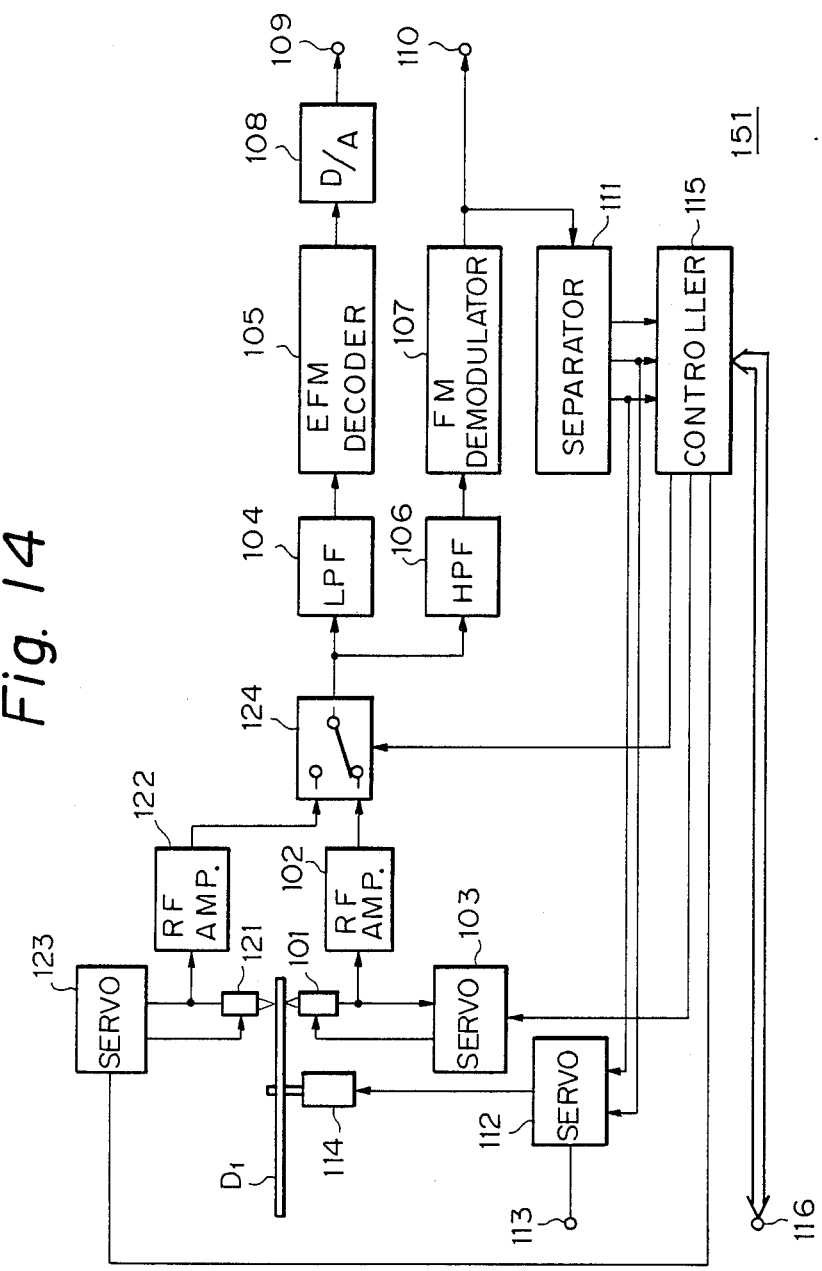
FIG. 14 is a block diagram showing the construction of the players in the system shown in FIG. 10.

FIG. 14 shows a specific construction of the player 151. In the figure, sides 1 and 2 of the disc D1 on which the narrow-band color video signal VR has been recorded are read out by means of optical pickups 101 and 121, respectively. As shown, the player 151 includes a further pickup 121, an RF amplifier 122, a servo circuit 123, and a selector switch 124 in addition to the elements of the player 50 shown in FIG. 9. An output signal of the pickup 121 is supplied to the RF amplifier 122, and the output signals of the RF amplifiers 102 and 122 are supplied to the selector switch 124. In addition, the servo circuit 123 operates in a manner similar to that the servo circuit 103. The controller 115 is designed to control the servo circuits 103 and 123 and the selector switch 124 in response to supplied command and data, and also deliver data indicative of a frame in read to the data input/output terminal.

In this way, the narrow-band color video signal of the frame indicated by the data provided by the controller 157 and in synchronism with the reference sync signal generated by the sync signal generator 156 is produced. The players 152 through 155 are constructed identically to the player 150.

Although in the foregoing embodiment the 3-division high-band monochrome signals H1 through H3 are converted into the signals H1' through H3' through the frequency conversion using frequency mixers and multipliers and alternative converting method is that the subcarriers are amplitude-modulated with 3-division high-band monochrome signals and filtered to from vestigial side band signals and then the monochrome signals are given the spectrum shown in FIG. 5 following frequency conversion. In this case, the vestigial side band signals after frequency conversion must have their subcarrier frequency relating to be $(2n+1)\cdot(fH/2)$, and it must be within the 6 MHz recording band.

Although in the previous embodiment the narrow-band 3-color signals with the high-band monochrome signals being merged thereto are recorded on three separate discs, it is also possible to record the 3-color signals in three recording regions provided on a single disc.

Although in the above embodiment the broad-band color video signals are recorded on both sides of five discs and the broad band color video signals are reproduced using five read systems, the present invention is applicable to any case where the number of recording discs and read system is four or more.

Although in the foregoing embodiment the discs D1 through D3 have their recording termination positions on side 1 made different from each other by a certain distance, an alternative scheme is that same information is recorded in duplicate in portions corresponding to a certain time length at the end of recording region on side 1 of the discs D1 through D3 and the beginning of the recording region on the side 1 of the disc D4 and the side 2 of the discs D1 and D2.

According to the inventive recording method, as described above the broad-band 3-color signals are separated into narrow-band 3-color signals and a high-band monochrome signal having a higher frequency band, the high-band monochrome signal is divided into three band, frequency-converted and then merged (convolved) into the narrow-band 3-color signals, while maintaining the frequency interlace relationship, thereby producing three composite color video signals. The composite color video signals are then recorded in different recording regions for the entire 20 MHz band without imposing a band width limit for moving picture, as in the MUSE (Multiple Sub-Nyquist Sampling Encoding) system, whereby high resolution pictures regardless of the motion or still type can be reproduced. Moreover, separate recording for 3-color signals does not create a jitter-caused hue variation at all, and a satisfactory picture reproduction is accomplished.

Furthermore, the frequency band width dealt with on the disc is within the range of the conventional optical video disc system, and therefore little circuit alteration is need for recording and playing back discs of this system, as an additional advantage of the inventive recording method.

Moreover, the frequency band width dealt with on the disc is within the range of the conventional optical video disc system, and therefore little circuit alteration is needed for recording and playing back discs of this system, as an additional advantage of the recording method according to the invention.

What is claimed is:

1. A method of recording broad-band 3-color video signals on at least one recording medium, comprising the steps of:
    separating said broad-band 3-color video signals into narrow-band 3-color signals and a high-band monochrome signal having a frequency band higher than a frequency band of said narrow band signals;
    dividing said high-band monochrome signal into three band components;
    converting in frequency said three band components of said high-band monochrome signal;
    merging said three band components of said high-band monochrome signal having been converted in frequency into said narrow-band 3-color signals, while maintaining a frequency interlace relationship, thereby producing three composite color video signals; and
    recording said three composite color video signals in different regions of said at least one recording medium.

2. A method according to claim 1, wherein said different recording regions are formed on different recording media.

3. A method of recording and reproducing broad-band 3-color video signals on at least one recording medium, comprising:
    separating said broad-band 3-color video signals into narrow-band 3-color signals and a high-band monochrome signal having a frequency band higher than a frequency band of said narrow band signals;
    dividing said high-band monochrome signal into three band components;
    converting in frequency said three band components of said high-band monochrome signal;
    merging said three band components of said high-band monochrome signal having been converted in frequency into said narrow-band 3-color signals, while maintaining a frequency interlace relationship, thereby producing three composite color video signals;
    recording said three composite color video signals in different recording regions of at least one recording medium;
    for reproduction, retrieving recording information from said three recording regions concurrently in synchronism with a predetermined reference signal separating said narrow-band 3-color signals from said retrieved composite color video signals;
    frequency-converting said three signals merged in said narrow-band 3-color signals while maintaining the frequency interlace relationship, and then summing said frequency-converted signals, thereby restoring said high-band frequency monochrome signal; and
    merging said high-band monochrome signals into each of said narrow-band 3-color signals so that said original broad-band 3-color signals are reproduced.

4. A method of recording and reproducing broad-band 3-color video signals on recording media, comprising:
    separating said broad-band 3-color video signals which carry a plurality of pictures relating to each other into narrow-band 3-color signals and a high-band monochrome signal having a frequency band higher than a frequency band of said narrow band signals;
    dividing said high-band monochrome signal into three band components;
    converting in frequency said three band components of said high-band monochrome signal;
    merging said three band components of said high-band monochrome signal having been converted in frequency into said narrow-band 3-color signals, while maintaining a frequency interlace relationship, thereby producing three composite color video signals;
    recording portions of said composite color video signals corresponding to portions of said pictures on one main surface of each of first, second and third recording media;
    recording portions which follow said portions of composite color video signals on one main surface of a fourth main surface and another main surface of said first and second recording media;
    for reproduction, reading recorded information out of one main surface of said first, second and third recording media;
    reading recording information out of one main surface of said fourth recording medium and another main surface of said first and second recording medium and another main surface of said first and second recording media; and
    reproducing said broad-band 3-color signals from said three composite color video signals.

5. A color video signal recording and reproducing method according to claim 4, wherein said first, second and third recording media have recording termination times for one main surfaces thereof made different by a predetermined time length from each other.

6. A color video signal recording and reproducing method according to claim 4, wherein same information is recorded in portions corresponding to a predetermined time length at the end of recording region of said first, second and third recording media and at the beginning of recording region on one main surface of said fourth recording medium and another main surface of said first and second recording media.

* * * * *